US012695384B2

(12) United States Patent
Tsuruta

(10) Patent No.: US 12,695,384 B2
(45) Date of Patent: Jul. 28, 2026

(54) POWER CONVERSION DEVICE

(71) Applicant: Mitsubishi Electric Corporation,
Tokyo (JP)

(72) Inventor: Ryoji Tsuruta, Tokyo (JP)

(73) Assignee: MITSUBISHI ELECTRIC
CORPORATION, Tokyo (JP)

( * ) Notice: Subject to any disclaimer, the term of this
patent is extended or adjusted under 35
U.S.C. 154(b) by 197 days.

(21) Appl. No.: 18/832,548

(22) PCT Filed: Feb. 10, 2022

(86) PCT No.: PCT/JP2022/005290
§ 371 (c)(1),
(2) Date: Jul. 24, 2024

(87) PCT Pub. No.: WO2023/152860
PCT Pub. Date: Aug. 17, 2023

(65) Prior Publication Data
US 2025/0105739 A1 Mar. 27, 2025

(51) Int. Cl.
*H02M 3/158* (2006.01)
*H02M 1/00* (2006.01)
(Continued)

(52) U.S. Cl.
CPC ......... *H02M 3/158* (2013.01); *H02M 1/0025*
(2021.05); *H02M 1/14* (2013.01); *H02M*
*3/156* (2013.01)

(58) Field of Classification Search
CPC ...... H02M 3/158; H02M 1/0025; H02M 1/14;
H02M 3/156; H02M 3/155
See application file for complete search history.

(56) References Cited

U.S. PATENT DOCUMENTS

RE43,946 E 1/2013 Sase et al.
11,296,630 B2 4/2022 Iezawa et al.
(Continued)

FOREIGN PATENT DOCUMENTS

JP 2008-113542 A 5/2008
JP 6858893 B1 4/2021

OTHER PUBLICATIONS

International Search Report and Written Opinion mailed on Apr. 19,
2022, received for PCT Application No. PCT/JP2022/005290, filed
on Feb. 10, 2022, 8 pages including English Translation.

*Primary Examiner* — Crystal L Hammond
*Assistant Examiner* — Jonathan Walter Soileau
(74) *Attorney, Agent, or Firm* — XSENSUS LLP

(57) ABSTRACT

A power conversion device includes a DC/DC converter
which transforms DC voltage inputted from a first DC
circuit, in accordance with a voltage command, and outputs
resultant voltage to a second DC circuit; and a controlling
circuitry which controls switching of semiconductor switch-
ing elements through comparison between a carrier wave
and a modulation wave as the voltage command. The
controlling circuitry adjusts, in accordance with the modu-
lation wave value, a first period for increasing the modula-
tion wave value so that the modulation wave exceeds the
carrier wave, so as to ensure both of a first cycle T1 in which
the semiconductor switching elements do not perform
switching over one cycle of the carrier wave and a second
cycle T2 in which the semiconductor switching elements
perform switching at any timing in one cycle of the carrier
wave.

20 Claims, 12 Drawing Sheets

(51) Int. Cl.
    H02M 1/14        (2006.01)
    H02M 3/156      (2006.01)

(56)           References Cited

U.S. PATENT DOCUMENTS

| 11,804,777 | B2 * | 10/2023 | Chen ................... H02M 3/1584 |
| 2008/0252277 | A1 | 10/2008 | Sase et al. |
| 2016/0028229 | A1 * | 1/2016 | Mitsutani ............. H02M 3/158 |
| | | | 307/82 |

* cited by examiner

PROCESSOR

STORAGE
DEVICE

71

72

INPUT

OUTPUT

POWER CONVERSION DEVICE

CROSS-REFERENCE TO RELATED APPLICATION

This application is a national stage application, pursuant to 35 U.S.C. § 371, of International Patent Application No. PCT/JP2022/005290, filed Feb. 10, 2022, the entire contents of which are incorporated herein by reference.

TECHNICAL FIELD

The present disclosure relates to a power conversion device.

BACKGROUND ART

Conventionally, in a DC/DC converter which transforms voltage of inputted DC power to a desired DC voltage value, technology for stabilizing output voltage of the DC/DC converter has been proposed so as to ensure desired output voltage. For example, a power conversion device as a switching power supply device that outputs desired voltage with output voltage stabilized by achieving fast response of a DC/DC converter in a case of sharp change in a load, is disclosed as shown below.

That is, in a step-down DC/DC converter of a switching power supply device as a conventional power conversion device, an upper-side power MOSFET is connected to an input terminal and a lower-side power MOSFET is connected to a ground potential side. An LC smoothing filter composed of an inductor and a capacitor, and an end of a CR filter composed of a resistor and a capacitor, are connected to an intermediate point between the upper-side power MOSFET and the lower-side power MOSFET, and another end of the CR filter and an output terminal are connected to an intermediate point of the LC smoothing filter. Here, in a case where a load of a power supply sharply decreases, output voltage sharply increases. If the voltage exceeds a voltage level Vref+α, a PWM pulse signal corresponding to a duty 0% is selected and outputted to a gate driver circuit. Thus, the lower-side power MOSFET is forcibly turned on, thereby quickly decreasing the output voltage, so that output voltage variation is significantly suppressed. On the other hand, in a case where the load sharply increases, the output voltage sharply decreases. If the voltage becomes lower than a voltage level Vref−α, a PWM pulse signal corresponding to a duty 100% is selected and outputted to the gate driver circuit. Thus, the upper-side power MOSFET is forcibly turned on, thereby quickly increasing the output voltage, so that output voltage variation is significantly suppressed (see, for example, Patent Document 1).

CITATION LIST

Patent Document

Patent Document 1: Japanese Laid-Open Patent Publication No. 2008-1.13542 (paragraphs [0015] to [0022])

SUMMARY OF THE INVENTION

Problem to be Solved by the Invention

In the switching power supply device described in Patent Document 1, inputted DC voltage is stepped down to be transformed to arbitrary DC voltage. Then, in response to voltage variation due to load variation, the duty cycle is changed to 100% or 0%, to transiently provide a period in which a semiconductor switching element does not perform switching, whereby voltage variation is suppressed and output voltage is stabilized, thus ensuring desired output voltage.

Here, the step-down DC/DC converter is generally unable to output voltage not less than input voltage. In addition, even in a case of not greater than input voltage, for example, the following is assumed. That is, in a power conversion device that performs ON/OFF control of a semiconductor switching element by determining the pulse width of a pulse signal for driving the semiconductor switching element on the basis of a carrier wave (Carrier wave), in a case where switching is performed for each frequency of the Carrier wave, there is a problem that output voltage according to an output voltage command cannot be provided due to the influence of a dead time or the like. Although it may be possible that the influence of the dead time is reduced by changing the frequency of the Carrier wave and thus output voltage according to the output voltage command is provided, such a configuration leads to complication of software and hardware.

The present disclosure has been made to solve the above problem, and an object of the present disclosure is to provide a power conversion device capable of stably outputting desired output voltage while having a simple configuration.

Means to Solve the Problem

A power conversion device according to the present disclosure includes: a DC/DC converter which has a semiconductor switching element, and which transforms DC voltage inputted from a first DC circuit, in accordance with a voltage command, and outputs the transformed DC voltage to a second DC circuit; and a control unit which controls switching of the semiconductor switching element on the basis of comparison between a carrier wave and a modulation wave which is the voltage command. The control unit adjusts, in accordance with a value of the modulation wave, a first period for increasing the value of the modulation wave so that the modulation wave exceeds the carrier wave, so as to ensure both of a first cycle T1 in which the semiconductor switching element does not perform switching over one cycle of the carrier wave and a second cycle T2 in which the semiconductor switching element performs switching at any timing in one cycle of the carrier wave.

Effect of the Invention

The power conversion device according to the present disclosure makes it possible to provide a power conversion device capable of stably outputting desired output voltage while having a simple configuration.

BRIEF DESCRIPTION OF THE DRAWINGS

FIG. 3 is a block diagram showing another circuit configuration example of the power conversion device according to embodiment 1.

FIG. 10 shows a specific configuration example of the overmodulation control unit of the power conversion device according to embodiment 1.

FIG. 12 shows an example of a hardware configuration of the control unit according to each embodiment.

DESCRIPTION OF EMBODIMENTS

Embodiment 1

Figure 1:
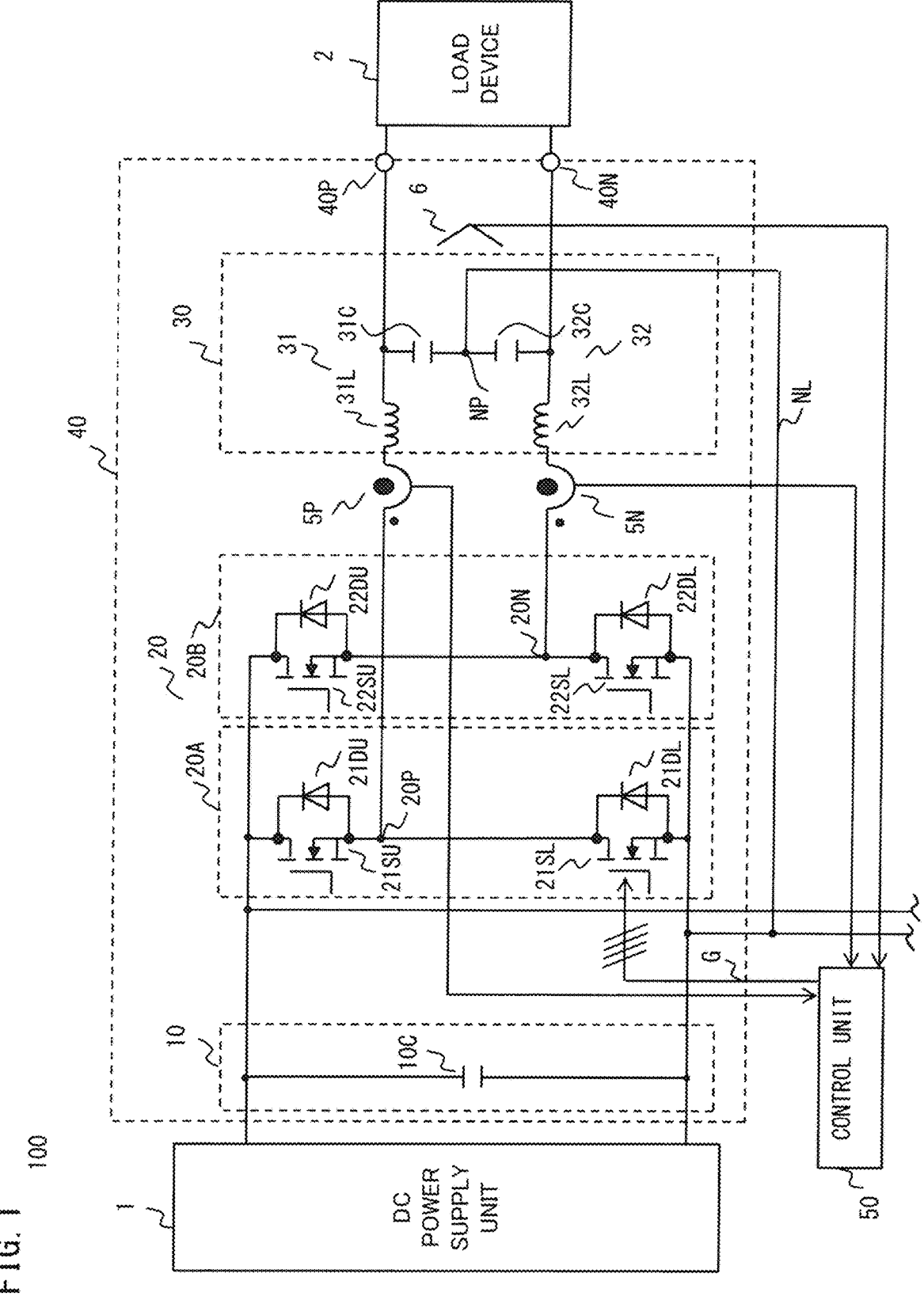
FIG. 1 is a block diagram showing a circuit configuration example of a power conversion device according to embodiment 1.

FIG. 1 is a block diagram showing a circuit configuration example of a power conversion device 100 according to embodiment 1.

The power conversion device 100 according to the present embodiment includes a DC/DC converter 40 and a control unit 50 which controls the DC/DC converter 40.

The DC/DC converter 40 is provided between a DC power supply unit 1 as a first DC circuit which outputs DC voltage and a load device 2 as a second DC circuit which receives DC voltage. The DC/DC converter 40 transforms the DC voltage inputted from the DC power supply unit 1, to desired DC voltage, and outputs the transformed DC voltage to the load device 2 via a positive terminal 40P and a negative terminal 40N.

The DC/DC converter 40 includes, in addition to the positive terminal 40P and the negative terminal 40N, a neutral point line NL having a neutral point potential between these terminals. As described in detail later, the neutral point line NL is arbitrarily connected to a circuit on the input side of the DC/DC converter 40.

Hereinafter, the detailed configuration of the DC/DC converter 40 will be described.

As shown in FIG. 1, the DC/DC converter 40 includes a DC link unit 10, a full-bridge chopper circuit unit 20, and a filter circuit unit 30.

The DC link unit 10 includes a DC link capacitor 10C provided between the positive side and the negative side of the DC power supply unit 1, and removes a ripple component of DC voltage from the DC power supply unit 1.

The full-bridge chopper circuit unit 20 includes an A-phase leg circuit 20A composed of semiconductor switching elements 21SU, 21SL connected in series via a positive point 20P as a first connection point, and flyback diodes 21DU, 21DL connected in antiparallel to the semiconductor switching elements 21SU, 21SL. The positive point 20P in the A-phase leg circuit 20A is connected to the positive terminal 40P via the filter circuit unit 30.

In addition, the full-bridge chopper circuit unit 20 includes a B-phase leg circuit 20B composed of semiconductor switching elements 22SU, 22SL connected in series via a negative point 20N as a second connection point, and flyback diodes 22DU, 22DL connected in antiparallel to the semiconductor switching elements 22SU, 22SL. The negative point 20N in the B-phase leg circuit 20B is connected to the negative terminal 40N via the filter circuit unit 30.

The full-bridge chopper circuit unit 20 is formed by connecting the leg circuit 20A and the leg circuit 20B configured as described above, in parallel, between the positive and negative sides of the DC power supply unit 1.

The filter circuit unit 30 is provided between the full-bridge chopper circuit unit 20, and the positive terminal 40P and the negative terminal 40N, and is connected to the external load device 2 via the positive terminal 40P and the negative terminal 40N.

A filter 31 of the filter circuit unit 30 includes a reactor 31L which is an inductance component and a filter capacitor 31C as an energy storage element which is a capacitance component. A first end of the reactor 31L is connected to the positive point 20P of the leg circuit 20A, and a second end thereof is connected to a first end of the filter capacitor 31C and the positive terminal 40P.

A filter 32 of the filter circuit unit 30 includes a reactor 32L which is an inductance component, and a filter capacitor 32C as an energy storage element which is a capacitance component. A first end of the reactor 32L is connected to the negative point 20N of the leg circuit 20B, and a second end thereof is connected to a first end of the filter capacitor 32C and the negative terminal 40N.

A second end of the filter capacitor 31C and a second end of the filter capacitor 32C are connected in series via a neutral point NP as a second connection point, and the neutral point NP is connected to the negative side of the DC link unit 10 on the input side of the DC/DC converter 40 via the neutral point line NL.

The neutral point line NL can be connected to an arbitrary part of the DC link unit 10 on the input side of the DC/DC converter 40, and may be connected to the positive side of the DC link unit 10, for example.

As described in detail later, the control unit 50 of the power conversion device 100 controls the semiconductor switching elements 21 (21SU, 21SL) and 22 (22SU, 22SL) of the full-bridge chopper circuit unit 20 by gate signals G, to step down DC voltage of the DC link unit 10 to DC voltage having a desired magnitude. As a control method for the semiconductor switching elements 21, 22, PWM control is used.

In order to control DC voltage and DC power flow having any magnitudes, the DC/DC converter 40 is provided with one current detector for each of the positive terminal 40P and the negative terminal 40N, i.e., a total of two current detectors 5P, 5N. Thus, the control unit 50 acquires current detection values i_sens1, i_sens2 of currents outputted from the full-bridge chopper circuit unit 20.

Further, the DC/DC converter 40 includes one voltage detection unit 6 for measuring voltage between the positive terminal 40P and the negative terminal 40N. Thus, the control unit 50 acquires an output voltage detection value V_sens between the positive terminal 40P and the negative terminal 40N.

Hereinafter, a power conversion device 100ex1 having a configuration different from that of the power conversion device 100 shown in FIG. 1 will be described.

Figure 2:
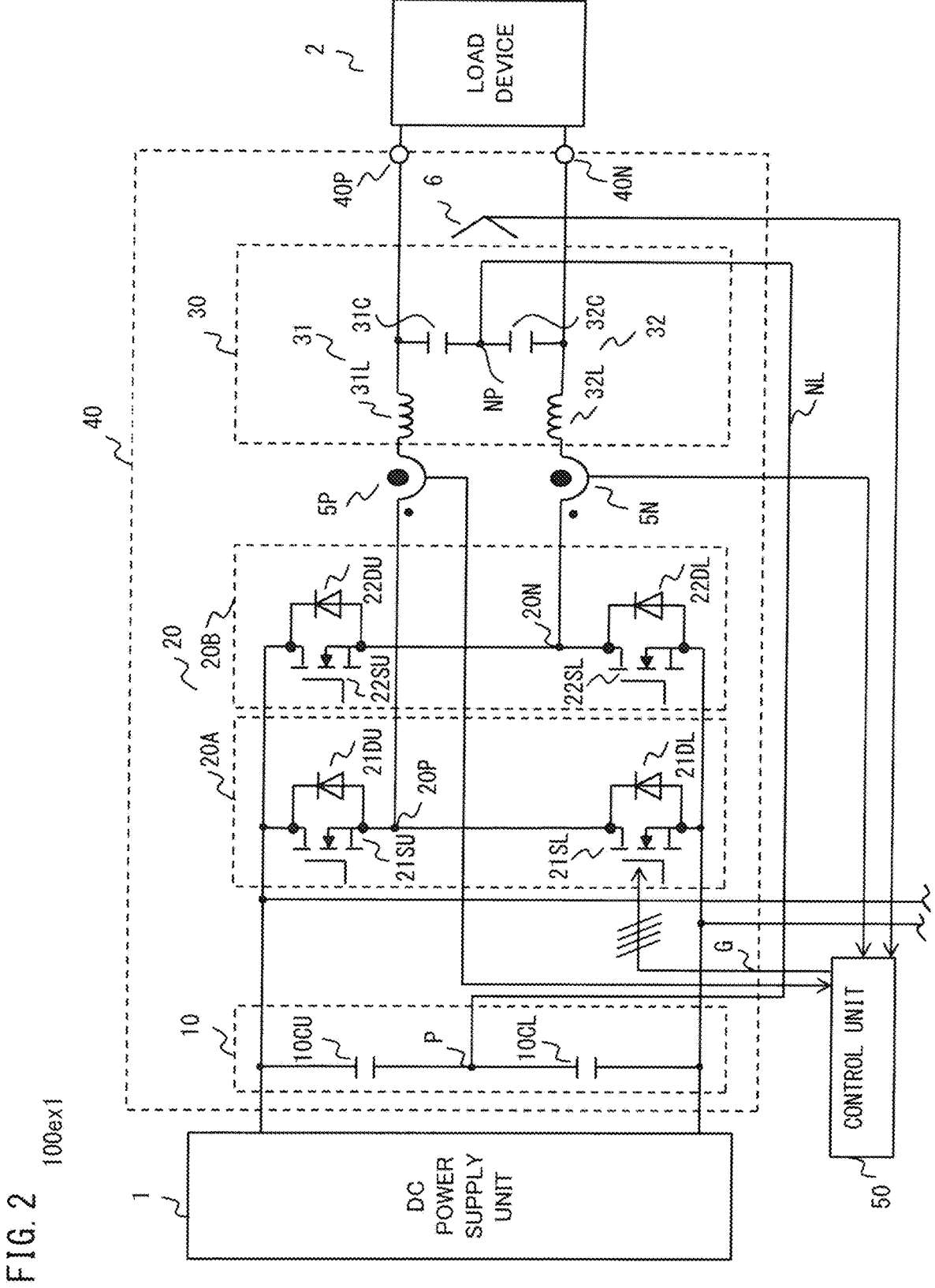
FIG. 2 is a block diagram showing another circuit configuration example of the power conversion device according to embodiment 1.

FIG. 2 is a block diagram showing a circuit configuration example of the power conversion device 100ex1 according to embodiment 1.

The basic configuration thereof is the same as that of the power conversion device 100 shown in FIG. 1, but a connection location of the neutral point line NL is different.

As shown in FIG. 2, the DC link unit 10 in the power conversion device 100ex1 is formed by a series unit of two DC link capacitors 10CU, 10CL, and the neutral point line NL is connected to a neutral point P which is a connection point between the capacitors 10CU, 10CL, i.e., a neutral-point-potential point between the positive side and the negative side of the DC power supply unit 1.

Thus, voltages applied to the filter capacitors 31C, 32C are equalized, so that withstand voltages required for the filter capacitors 31C, 32C are reduced, whereby it becomes possible to downsize the filter capacitors 31C, 32C.

Hereinafter, a power conversion device 100ex2 having a configuration different from those of the power conversion devices 100, 100ex1 will be described.

Figure 3:
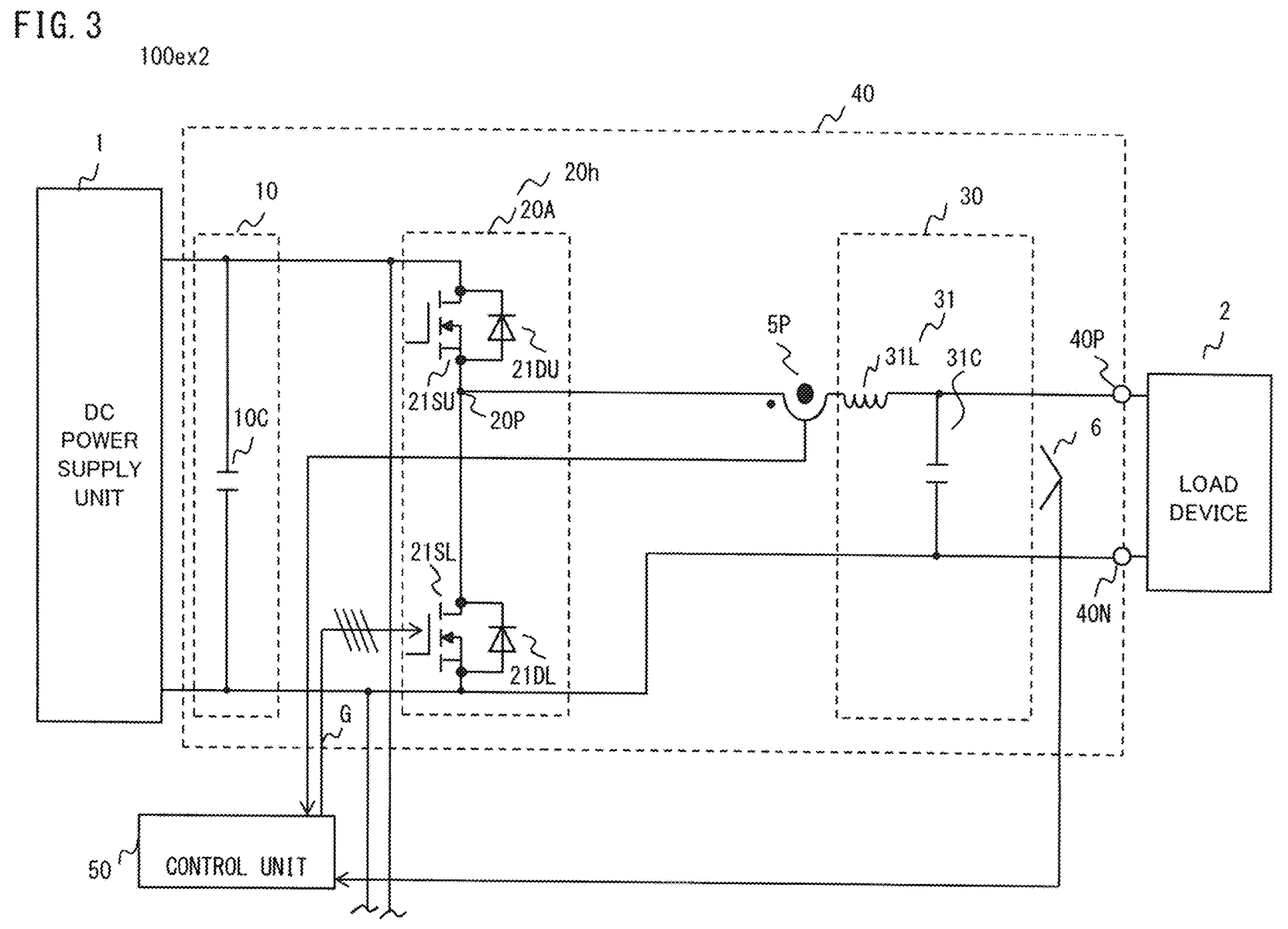

FIG. 3 is a block diagram showing a circuit configuration example of the power conversion device 100ex2 according to embodiment 1.

In the above power conversion devices 100, 100ex1, the DC/DC converter 40 has a full-bridge chopper circuit having four semiconductor switching elements, and two current detectors are respectively provided to the positive point and the negative point of the full-bridge chopper circuit.

However, the DC/DC converter 40 is not limited to the above configurations, and the DC/DC converter 40 may have such a configuration that inputted DC voltage can be transformed to arbitrary DC voltage. For example, a configuration having a half-bridge chopper circuit using two semiconductor switching elements may be adopted as described below.

As shown in FIG. 3, a half-bridge chopper circuit unit 20h includes a leg circuit 20A composed of semiconductor switching elements 21SU, 21SL connected in series via a positive point 20P as a first connection point, and flyback diodes 21DU, 21DL connected in antiparallel to the semiconductor switching elements 21SU, 21SL. The positive point 20P in the leg circuit 20A is connected to the positive terminal 40P via the filter circuit unit 30.

The filter circuit unit 30 is provided between the half-bridge chopper circuit unit 20h and the positive terminal 40P, and is connected to the external load device 2 via the positive terminal 40P.

The filter 31 in the filter circuit unit 30 includes the reactor 31L which is an inductance component and the filter capacitor 31C as an energy storage element which is a capacitance component. The first end of the reactor 31L is connected to the positive point 20P of the leg circuit 20A, and the second end thereof is connected to the first end of the filter capacitor 31C and the positive terminal 40P.

Using the half-bridge configuration as described above makes it possible to decrease the number of necessary semiconductor switching elements and the number of necessary current detectors. Meanwhile, in this configuration, the potentials at the positive terminal 40P and the negative terminal 40N are not positive-negative symmetric, and therefore it might be necessary to separately provide means for fixing potentials.

In the power conversion device 100 according to the present embodiment 1, power flow between the DC power supply unit 1 on the input side and the load device 2 on the output side is not particularly prescribed. For example, the direction of power flow between the DC power supply unit 1 and the load device 2 may be reversed, i.e., a boost circuit may be adopted as the DC/DC converter 40.

The load device 2 may be a DC load that receives and consumes DC power, e.g., a storage battery such as a lithium ion battery that can be charged with DC power and discharge DC power arbitrarily, and in this case, power can be mutually transferred between the DC power supply unit 1 and the load device 2 connected via the DC link unit 10.

In FIG. 1 to FIG. 3, one DC/DC converter 40 is provided, but the power conversion device according to the present embodiment is assumed to be a system having a plurality of different DC power distribution grids and thus can include two or more DC/DC converters 40 via the DC link unit 10. At this time, the configurations of the DC/DC converters 40 are the same but voltages to be outputted can be each set arbitrarily.

Figure 4:
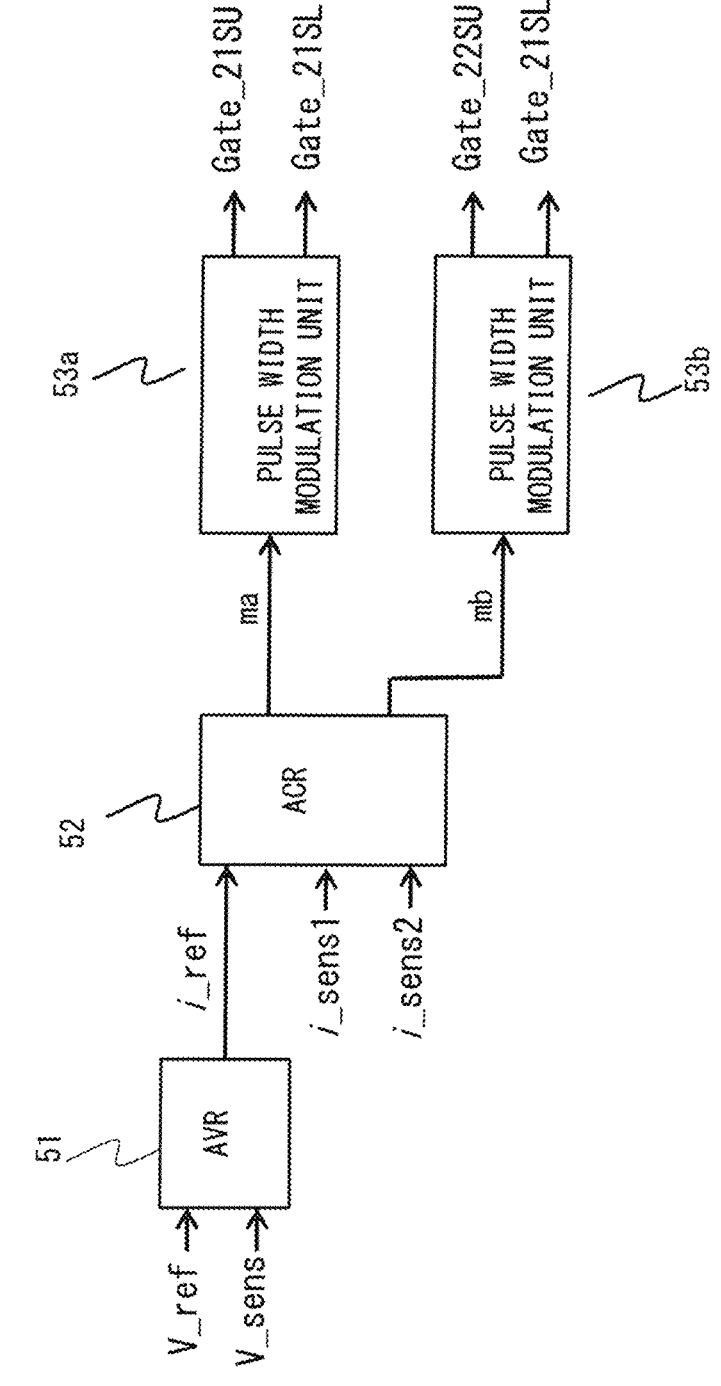
FIG. 4 shows a configuration example of a control unit of the power conversion device according to embodiment 1.

FIG. 4 shows a configuration example of the control unit 50 of the power conversion device 100 according to the present embodiment 1. Here, a configuration example of the control unit 50 in the power conversion device 100 in a case of adopting the full-bridge chopper circuit unit 20 shown in FIG. 1 as the DC/DC converter 40, is shown.

As shown in FIG. 4, the control unit 50 includes an output voltage control unit (automatic voltage regulator) 51, a current control unit (automatic current regulator) 52, and pulse width modulation units 53a, 53b.

In order to step down inputted DC voltage to arbitrary DC voltage and output the stepped-down DC voltage, the power conversion device 100 performs control so that an output voltage detection value V_sens detected by the voltage detection unit 6 follows an output voltage command V_ref.

In this control, first, the output voltage control unit 51 receives the output voltage command V_ref and the output voltage detection value V_sens, and calculates an output current command value i_ref which is current to be outputted by the DC/DC converter 40. The calculated output current command value i_ref is inputted to the current control unit 52 at the subsequent stage.

Next, on the basis of the inputted output current command value i_ref, and the current detection values i_sens1, i_sens2 of currents outputted from the full-bridge chopper circuit unit 20, which are detected by the current detectors 5P, 5N, the current control unit 52 calculates modulation waves ma, mb for the two leg circuits 20A, 20B of the full-bridge chopper circuit unit 20.

The current control unit 52 inverts the polarity of the modulation wave ma for the leg circuit 20A using an inversion circuit (not shown), and outputs the resultant modulation wave as the modulation wave mb for the leg circuit 20B.

The calculated modulation waves ma, mb are inputted to the pulse width modulation units 53a, 53b, respectively.

The pulse width modulation units 53a, 53b generate and output gate signals G (Gate_21SU, Gate_21SL, Gate_22SU, Gate_21SL) for driving the semiconductor switching elements 21, 22 of the two leg circuits 20A, 20B of the full-bridge chopper circuit unit 20. Thus, the semiconductor switching elements 21, 22 of the full-bridge chopper circuit unit 20 undergo ON/OFF operations, so that the DC voltage supplied via the DC link unit 10 is stepped down to DC voltage according to the output voltage command V_ref.

Figure 5:
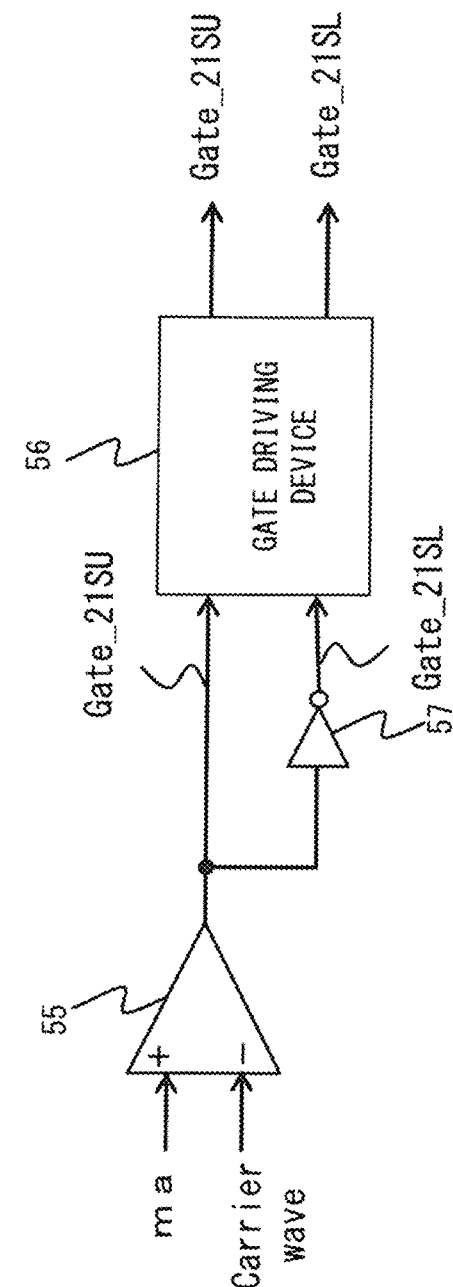
FIG. 5 shows a configuration example of a pulse width modulation unit of the power conversion device according to embodiment 1.

FIG. 5 shows a specific configuration example of the pulse width modulation unit 53a shown in FIG. 4.

Figure 6:
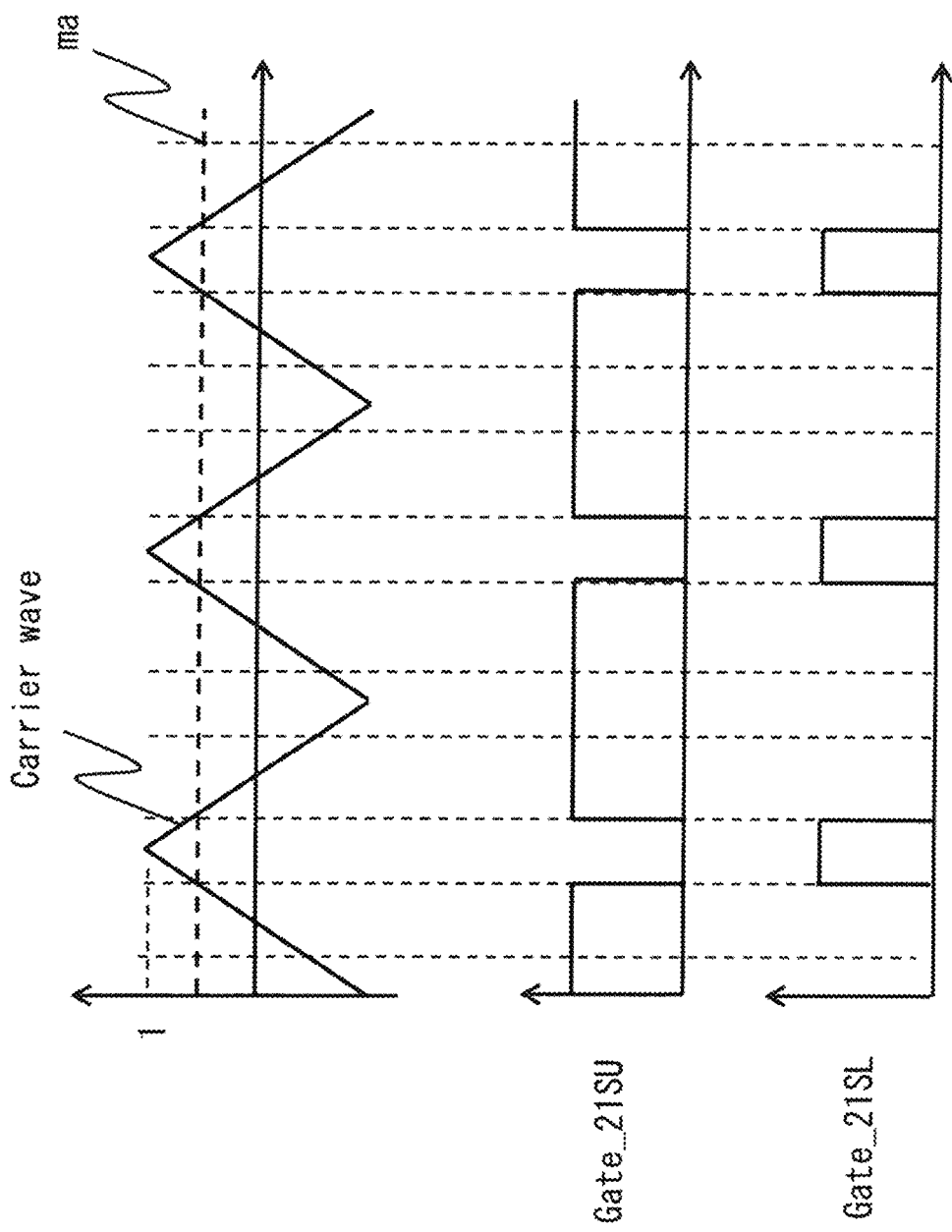
FIG. 6 is a waveform diagram illustrating control in the pulse width modulation unit of the power conversion device according to embodiment 1.

FIG. 6 is a waveform diagram illustrating control in the pulse width modulation unit 53a shown in FIG. 4.

The configuration of the pulse width modulation unit 53*b* is the same as that of the pulse width modulation unit 53*a* described below, and therefore will not be described repeatedly.

Here, as an example, generation of a pulse signal to be the gate signals G for the semiconductor switching elements 21SU, 21SL composing the leg circuit 20A in the full-bridge chopper circuit unit 20 shown in FIG. 1 will be described.

In the pulse width modulation unit 53*a*, the magnitudes of the given modulation wave ma and a Carrier wave as the carrier wave are compared by a comparator 55, to generate a pulse signal to be the gate signals G. Here, the comparator 55 outputs 1 as an ON signal when the modulation wave ma is greater than the Carrier wave, and outputs 0 as an OFF signal when the modulation wave ma is smaller than the Carrier wave.

On the basis of the pulse signal outputted from the comparator 55, the gate signal G (Gate_21SU) for the semiconductor switching element 21SU is generated as shown in FIG. 6.

In addition, on the basis of a pulse signal inverted by the inversion circuit 57 from the signal outputted by the comparator 55, the gate signal G (Gate_21SL) for the semiconductor switching element 21SL which is an opposite element in the same leg is generated as shown in FIG. 6.

Then, the generated gate signals Gate_21SU, Gate_21SL are converted by a gate driving device 56 to voltages that can actually perform ON/OFF driving for the semiconductor switching elements 21SU, 21SL. By the gate signals Gate_21SU, Gate_21SL generated as described above, the semiconductor switching elements 21SU, 21SL in the same leg circuit are respectively driven.

With the gate signals for the semiconductor switching elements generated as described above, the semiconductor switching elements in the same leg circuit are controlled such that the semiconductor switching element in one of the upper arm or the lower arm is turned off when the other semiconductor switching element is on. Thus, voltage of the DC link unit 10 is prevented from being short-circuited between positive terminals of the leg circuit 20A.

With the above configuration, ideally, it is possible to prevent short-circuit due to simultaneous turning-ON of the semiconductor switching elements of the upper arm and the lower arm in the same leg circuit. However, in general, a dead time during which the semiconductor switching elements of the upper arm and the lower arm are both turned off is provided in order to prevent the semiconductor switching elements in the same leg circuit from being simultaneously turned on due to variations in the semiconductor switching elements and the gate driving devices.

Here, the full-bridge chopper circuit unit 20 has a configuration symmetric between the positive terminal 40P and the negative terminal 40N, and the modulation wave ma as a voltage command for the leg circuit 20A and the modulation wave mb as a voltage command for the leg circuit 208 in the full-bridge chopper circuit unit 20 have polarities inverted from each other as described above. Thus, voltages outputted to the positive terminal 40P and the negative terminal 40N become positive-negative symmetric with respect to the potential of the neutral point line NL.

That is, as shown in FIG. 1, in the configuration in which the neutral point line NL is connected to a ground-side potential which is the negative side of the DC link unit 10, voltages outputted to the positive terminal 40P and the negative terminal 40N are positive-negative symmetric with respect to the ground-side potential. As shown in FIG. 2, in the configuration in which the neutral point line NL is connected to the neutral point P of the DC link unit 10, voltages outputted to the positive terminal 40P and the negative terminal 40N are positive-negative symmetric with respect to the neutral point potential at the neutral point P between the positive side and the negative side of the DC link unit 10.

Although not shown in FIG. 5, an overmodulation control unit 60 described below, which is a major part in the present embodiment, is actually provided in the pulse width modulation unit 53*a*.

Hereinafter, the overmodulation control unit 60 will be described.

Figure 7:
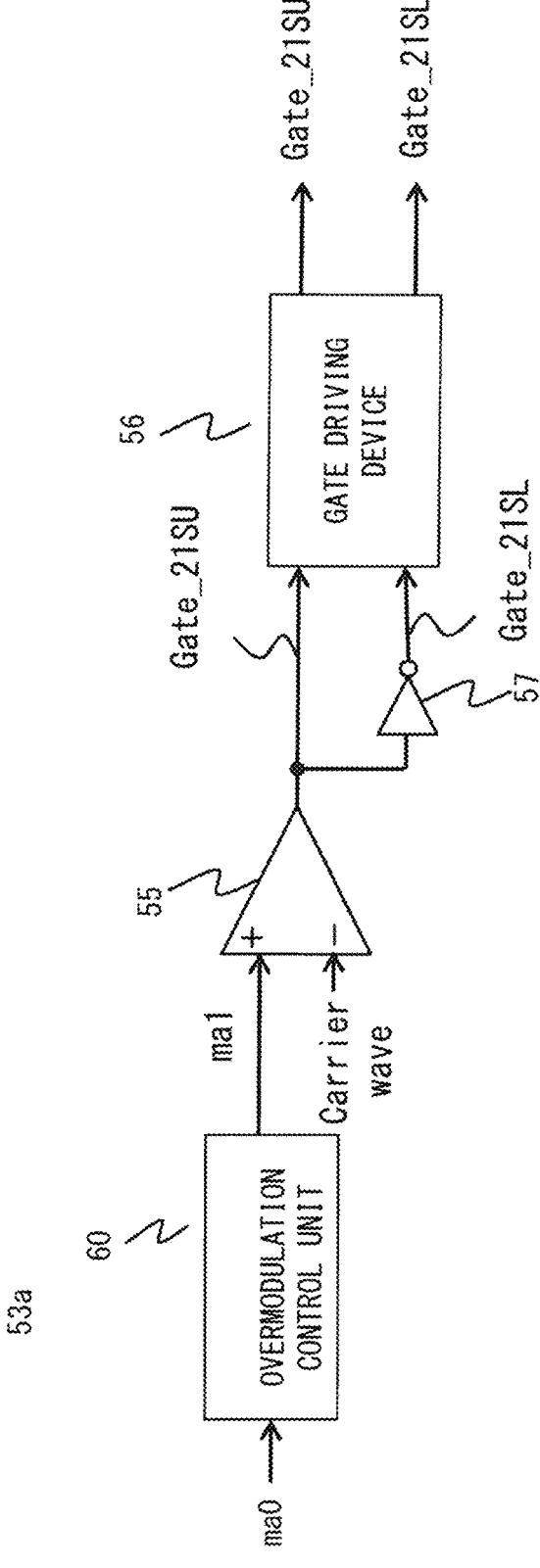
FIG. 7 is a block diagram showing an example of a location where an overmodulation control unit is interposed in the power conversion device according to embodiment 1.

FIG. 7 shows an example of a location where the overmodulation control unit 60 is provided in the control unit 50, according to embodiment 1.

As shown in FIG. 7, the overmodulation control unit 60 of the present embodiment is interposed on a side preceding the comparator 55 in the pulse width modulation unit 53*a* shown in FIG. 5.

Here, in a case where the full-bridge chopper circuit unit 20 shown in FIG. 1 is adopted as the DC/DC converter 40, an ideal modulation wave ma given to the pulse width modulation unit 53*a* for driving the leg circuit 20A is represented by the following expression.

$$ma = Vout / Vin$$

Here, Vout is output voltage and Vin is input voltage.

That is, if the input voltage Vin is assumed to be fixed, the modulation factor increases as the output voltage Vout increases. Ideally, voltage up to Vin=Vout can be outputted in accordance with the above expression. However, voltage that the DC/DC converter 40 can output is limited due to the influence of voltage reduction due to the impedance on the main circuit, the dead time, the minimum pulse width time of the gate signal G provided in switching of the semiconductor switching element, and the like.

In particular, the influence of output voltage error due to the dead time depends on the frequency of the Carrier wave. Therefore, in a case of performing switching for each carrier cycle, the range of voltage that cannot be outputted is widened.

As shown in FIG. 7, in the present embodiment, the pulse width modulation unit 53*a* has the overmodulation control unit 60 at a stage before the modulation wave and the Carrier wave are compared to generate a pulse signal.

The overmodulation control unit 60 is a control unit for adjusting the magnitude of the modulation wave. In FIG. 7, a modulation wave to be inputted to the overmodulation control unit 60 is denoted by ma0, and a modulation wave adjusted and outputted by the overmodulation control unit 60 is denoted by ma1.

In the overmodulation control unit 60, a threshold DTh is set for the modulation wave ma0. Then, the overmodulation control unit 60 performs overmodulation control in which, at a phase when the modulation wave ma0 exceeds the threshold DTh, the modulation wave ma0 is forcibly increased to not less than 1, i.e., to a value greater than the amplitude of the Carrier wave. Then, the overmodulation control unit 60 outputs the modulation wave adjusted as described above, as the modulation wave ma1, to the comparator 55.

The comparator 55 compares the adjusted modulation wave ma1 and the Carrier wave, to generate the pulse signal to be the gate signals G.

Hereinafter, the overmodulation control in the overmodulation control unit 60 will be described with reference to a waveform diagram showing the modulation wave and the Carrier wave.

FIG. e shows the gate signal G (Gate_21SU) for the semiconductor switching element 21SU in a case where control by the overmodulation control unit 60 is not performed, as a comparative example.

Figure 9:
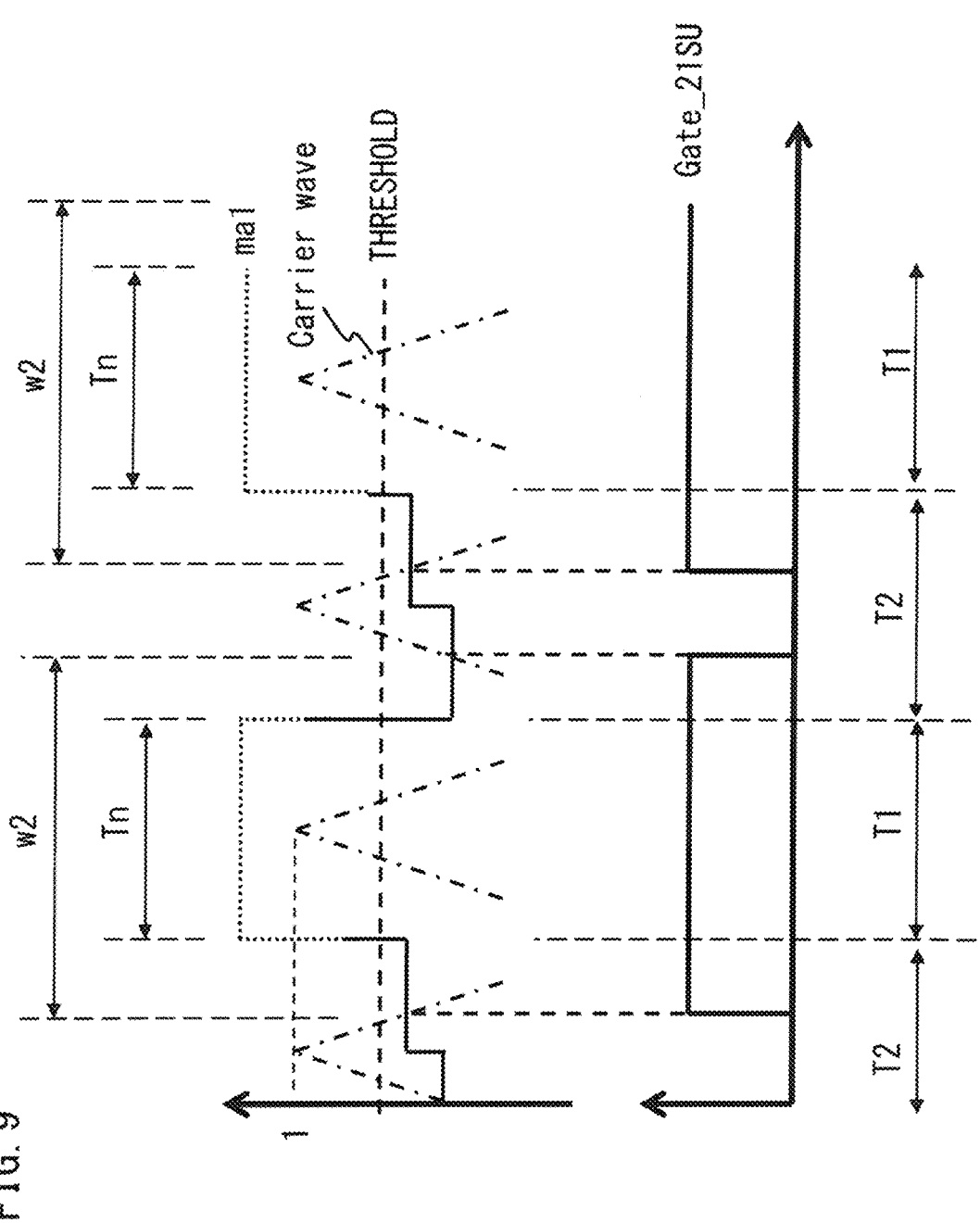
FIG. 9 shows a gate signal in a case where overmodulation control by the overmodulation control unit is performed in the power conversion device according to embodiment 1.

FIG. 9 shows the gate signal G (Gate_21SU) for the semiconductor switching element 21SU in a case of performing overmodulation control by the overmodulation control unit 60, according to embodiment 1.

Figure 8:
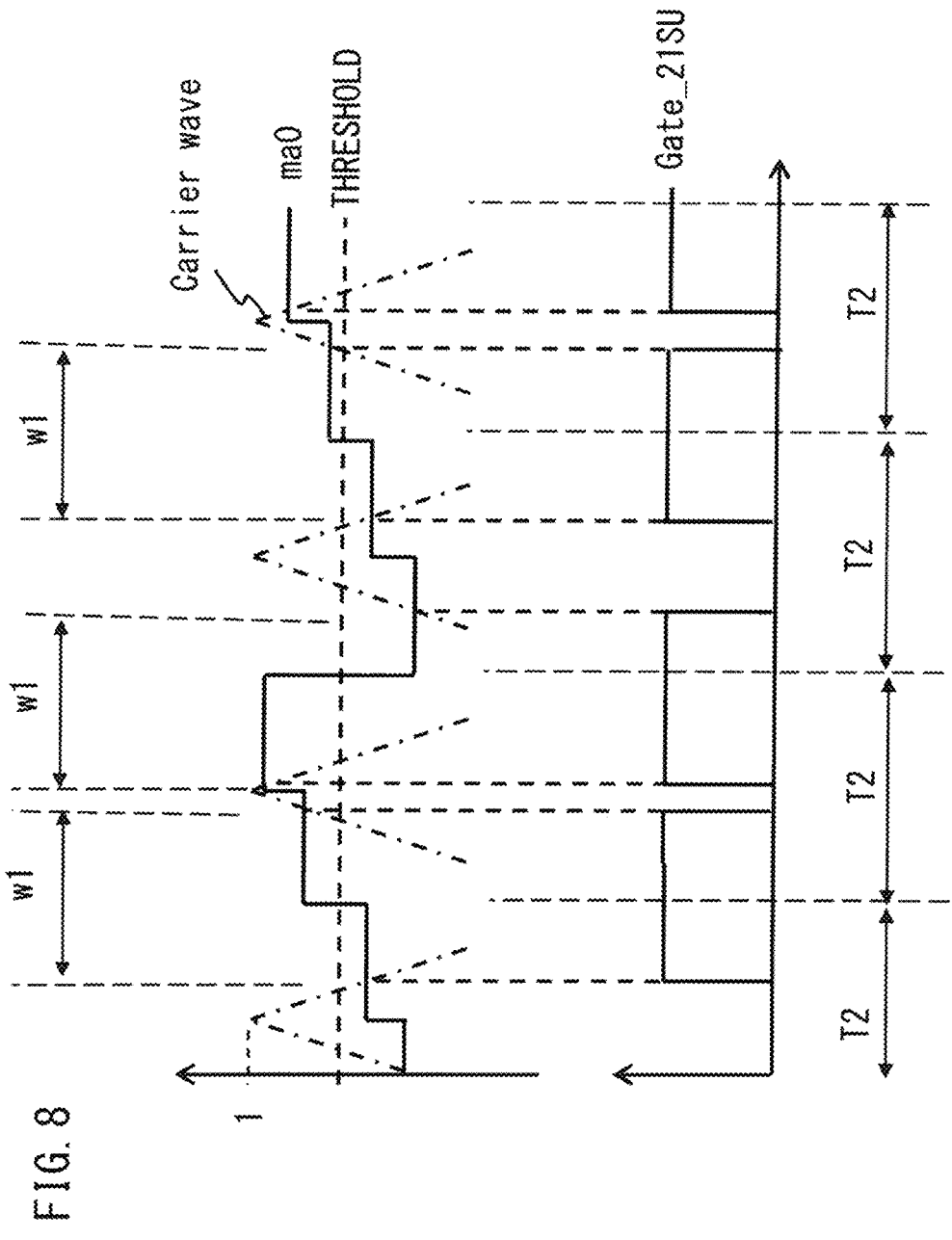
FIG. 8 shows a gate signal in a case where control by the overmodulation control unit is not performed in the power conversion device according to embodiment 1.

In a phase range in which the modulation wave ma0 exceeds the threshold DTh in FIG. 8, the value of the modulation wave ma1 in FIG. 9 is increased so as to exceed the Carrier wave through overmodulation control. A first period Tn in which the modulation wave ma1 is adjusted so as to exceed the Carrier wave is a period in which switching of the semiconductor switching element 21SU is not performed, i.e., the semiconductor switching element 21SU is fixed in an ON state.

As a result, the length of the period in which switching of the semiconductor switching element 21SU is not performed is adjusted from w1 shown in FIG. 8 to w2 shown in FIG. 9.

In the first period Tn in which the modulation wave ma1 is adjusted so as to exceed the Carrier wave through overmodulation control, the modulation wave ma1 can be regarded as 1, and ideally, the input and the output of the DC/DC converter 40 are connected so that the output voltage Vout increases so as to be equal to Vin. However, as described in FIG. 4, control for making desired output voltage according to the output voltage command V_ref is performed at the stage preceding the pulse width modulation unit 53*a*, so that the value of the modulation wave ma0 is to be decreased.

As a result, as shown in FIG. 9, after the first period Tn in which the value of the modulation wave ma1 is adjusted so as to exceed the Carrier wave is ensured over a certain period, the modulation wave ma1 returns to a value not greater than the threshold DTh, and then switching of the semiconductor switching element 201 is restarted.

Here, among the cycles of the Carrier wave shown in FIG. 9, both of a first cycle T1 in which the semiconductor switching element does not perform switching over one cycle of the Carrier wave and a second cycle T2 in which the semiconductor switching element performs switching at any timing in one cycle of the Carrier wave, are alternately ensured.

That is, in the overmodulation control, in accordance with the value of the modulation wave, the overmodulation control unit 60 adjusts the length of the first period Tn for performing adjustment so as to forcibly increase the modulation wave to a value not less than 1 so that the first cycle T1 in which switching is not performed over one cycle of the Carrier wave and the second cycle T2 in which switching is performed at any timing in one cycle of the Carrier wave are both ensured.

In this way, in a region in which the ratio of the output voltage is high relative to the input voltage, i.e., a phase range in which the value of the modulation wave becomes great, the first cycle T1 in which switching is not performed over one cycle of the Carrier wave is ensured. Thus, in the region in which the ratio of the output voltage is high relative to the input voltage, the dead time is not set, so that output voltage error is reduced. Therefore, even in the region in which the ratio of the output voltage is high relative to the input voltage, it is possible to accurately output voltage according to the output voltage command. Thus, as compared to a case of general control in which switching is performed for each carrier frequency, desired output voltage can be more stably outputted.

As described above, the threshold DTh is set at such a value that the first cycle T1 in which switching is not performed over one cycle of the Carrier wave is ensured in the region in which the ratio of the output voltage is high relative to the input voltage. Since the first period Tn changes depending on also the configuration of the overmodulation control unit and various control parameters, the setting of the threshold may be made on the basis of the parameters.

As described above, in the overmodulation control unit 60, the threshold DTh is set for the modulation wave ma0, and the first period Tn is set in a phase range in which the modulation wave ma0 exceeds the threshold DTh. That is, the first period Tn is set in a phase range in which the maximum value of the modulation wave ma0 is included. Thus, in the region in which the ratio of the output voltage is high relative to the input voltage, the first cycle T1 in which switching is not performed can be reliably ensured.

The first period Tn may be adjusted by the control unit 50 adjusting the amplitude of the Carrier wave.

Figure 10:
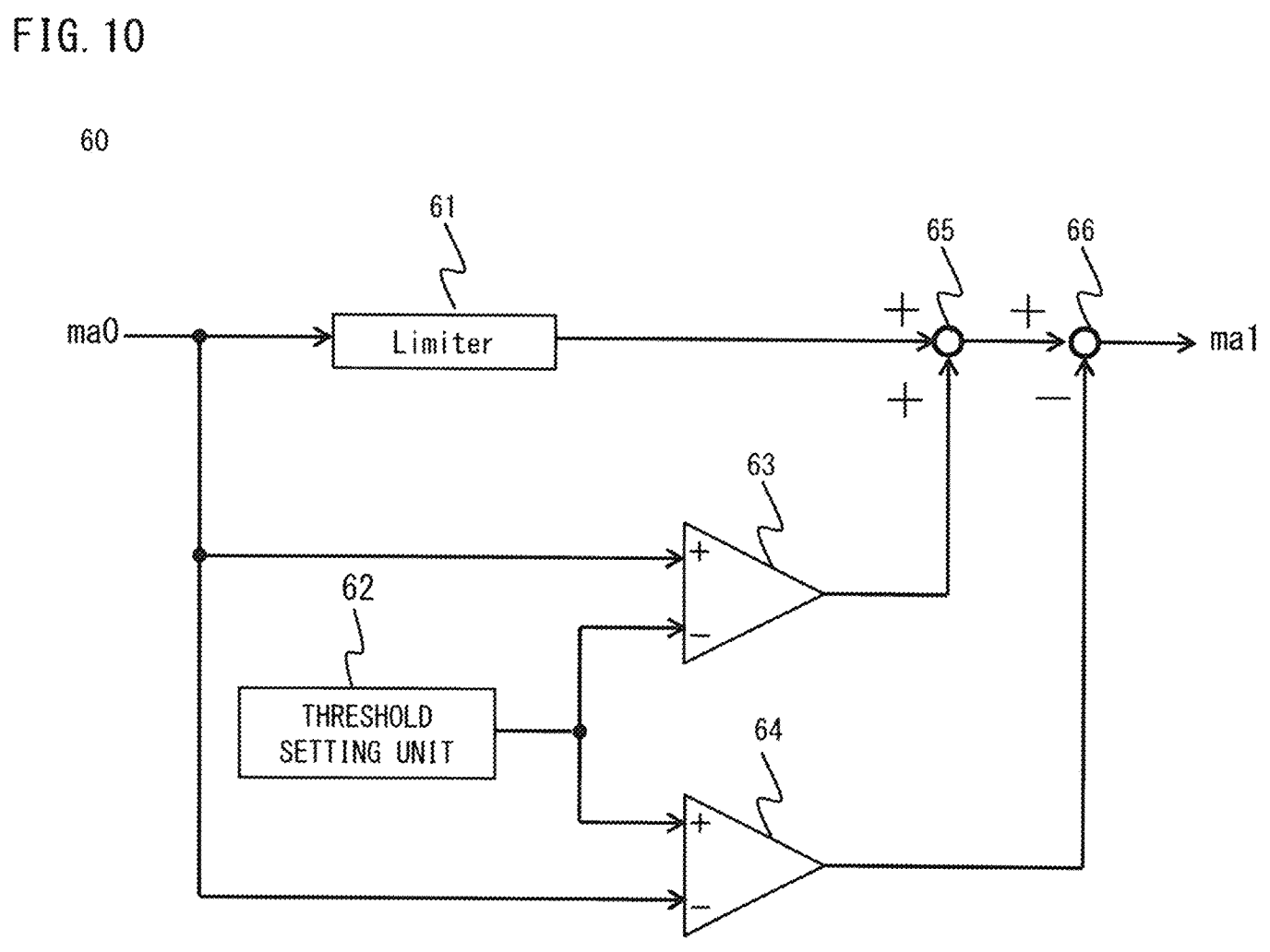

FIG. 10 shows a specific configuration example of the overmodulation control unit 60 according to embodiment 1. When the modulation wave ma0 not less than a set upper limit value is inputted, a limiter circuit 61 forcibly sets the output to the set upper limit value, and when the modulation wave ma0 not greater than a set lower limit value is inputted, the limiter circuit 61 forcibly sets the output to the set lower limit value. When a value other than the above values is inputted, the limiter circuit 61 outputs the value as it is, at a gain of 1. In addition, a threshold setting unit 62 which outputs the set threshold DTh, a comparator 63, and an adder 65 are combined, whereby the modulation wave ma0 exceeding the threshold DTh outputted from the threshold setting unit 62 forcibly becomes a value not less than 1.

In a case where the two leg circuits 20A, 20B as in the full-bridge chopper circuit unit 20 are provided, even in such a configuration that the polarity of the modulation wave of one leg circuit is inverted from the polarity of the modulation wave of the other leg circuit, a comparator 64 and a subtractor 66 may be combined so as to enable application of the overmodulation control unit 60, whereby it is possible to implement processing applicable to the two leg circuits 20A, 20B.

The power conversion device of the present embodiment configured as described above includes: a DC/DC converter which has a semiconductor switching element, and which transforms DC voltage inputted from a first DC circuit, in accordance with a voltage command, and outputs the transformed DC voltage to a second DC circuit; and a control unit which controls switching of the semiconductor switching element on the basis of comparison between a carrier wave and a modulation wave which is the voltage command. The control unit adjusts, in accordance with a value of the modulation wave, a first period for increasing the value of the modulation wave so that the modulation wave exceeds the carrier wave, so as to ensure both of a first cycle T1 in which the semiconductor switching element does not perform switching over one cycle of the carrier wave and a second cycle T2 in which the semiconductor switching element performs switching at any timing in one cycle of the carrier wave.

As described above, the control unit adjusts, in accordance with a value of the modulation wave, the first period Tn for increasing the value of the modulation wave so that the modulation wave exceeds the carrier wave, so as to ensure both of the first cycle T1 in which the semiconductor switching element does not perform switching over one cycle of the carrier wave and the second cycle T2 in which the semiconductor switching element performs switching at any timing in one cycle of the carrier wave.

Thus, since switching is not performed for each cycle of the carrier wave, output voltage error due to the influence of the dead time can be suppressed. As a result, it is possible to expand the range of voltage that can be outputted without changing the frequency of the Carrier wave. Therefore, without causing design change in hardware and complication of the control unit along with change in the frequency of the Carrier wave, the power conversion device can stably output desired voltage according to the output voltage command, while having a simple configuration.

In addition, in the power conversion device of the present embodiment configured as described above, the first period is set in a phase range in which a maximum value of the modulation wave is included.

Therefore, in a region in which the ratio of the output voltage is high relative to the input voltage, the first period in which the value of the modulation wave is increased so that the modulation wave exceeds the carrier wave is reliably ensured, whereby control can be performed so that the semiconductor switching element does not perform switching. Thus, also in the region in which the ratio of the output voltage is high relative to the input voltage, the range of voltage that can be outputted can be expanded and voltage according to the output voltage command can be more stably outputted.

In addition, in the power conversion device of the present embodiment configured as described above, with a threshold set for the modulation wave, the control unit increases the value of the modulation wave so that the modulation wave exceeds the carrier wave, in a phase range in which the modulation wave exceeds the threshold, and the threshold is adjusted so as to provide the first period that ensures both of the first cycle T1 and the second cycle T2.

As described above, the threshold is set for the modulation wave, and when the modulation wave exceeds the threshold, the value of the modulation wave is increased so that the modulation wave exceeds the carrier wave. Thus, at a phase when the modulation wave exceeds the threshold, i.e., in a region in which the ratio of the output voltage is high relative to the input voltage, control can be assuredly performed so that the semiconductor switching element does not perform switching.

In addition, since the threshold is adjusted so that the first period that ensures both of the first cycle T1 and the second cycle T2 is obtained, switching is performed not for each cycle of the carrier wave. Thus, output voltage error due to the influence of the dead time can be suppressed.

In addition, it becomes possible to change the first period through setting of the control parameter and the threshold. In addition, by setting the threshold appropriately as described above, control can be performed so that the first period is not set in a region in which the output voltage is small relative to the input voltage.

Embodiment 2

Hereinafter, embodiment 2 of the present disclosure will be described focusing on difference from the above embodi-ment 1, with reference to the drawings. The same parts as those in the above embodiment 1 are denoted by the same reference characters and the description thereof is omitted.

Figure 11:
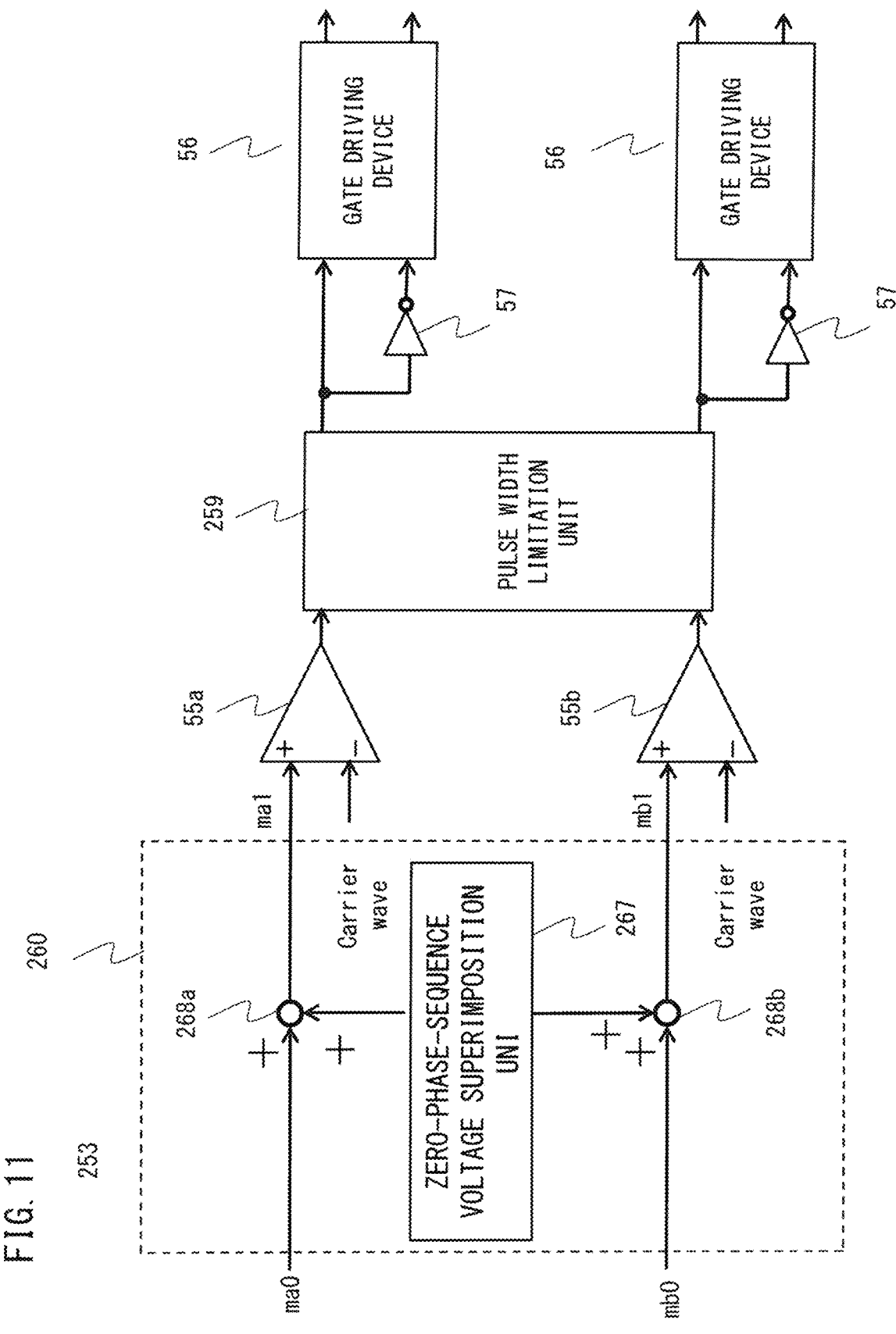
FIG. 11 shows a configuration example of a pulse width modulation unit of a power conversion device according to embodiment 1.

FIG. 11 shows the configuration of a pulse width modulation unit 253 of a power conversion device according to the present embodiment 2. In the power conversion device according to the present embodiment 2, the configuration of the DC/DC converter 40 is the same as the full-bridge chopper circuit unit shown in embodiment 1, but the control method by the overmodulation control unit 60 is different.

In the power conversion device according to the present embodiment 2, a DC/DC converter having a half-bridge chopper configuration cannot be applied because zero-phase-sequence voltage which is common voltage between the positive terminal and the negative terminal which are output terminals cannot be controlled, as described later.

As shown in FIG. 11, an overmodulation control unit 260 of the present embodiment is provided on the preceding side of comparators 55a, 55b in the pulse width modulation unit 53a, as in embodiment 1.

The overmodulation control unit 260 includes a zero-phase-sequence voltage superimposition unit 267 and adders 268a, 268b.

In the overmodulation control unit 260, the zero-phase-sequence voltage superimposition unit 267 adds, by the adders 258a, 258b, a zero-phase-sequence voltage command which is a common value for the phases, to modulation waves ma0, mb0 for the two leg circuits 20A, 20B calculated by the output voltage control unit 51 and the current control unit 52. At this time, the zero-phase-sequence voltage command has an AC waveform, and the zero-phase-sequence voltage command is set so as to oscillate with a cycle that is an integer multiple of the cycle of the Carrier wave, whereby it becomes possible to establish synchronization with the carrier cycle and the operation cycle of the control unit 50 which is synchronized with the carrier cycle. Thus, it becomes possible to perform overmodulation control in synchronization with the Carrier wave.

Here, the zero-phase-sequence voltage command is AC with a frequency based on the carrier cycle as described above, but the waveform thereof is not particularly specified and may be such a waveform that, when the zero-phase-sequence voltage command is superimposed on the modulation waves ma0, mb0, modulation waves ma1, mb1 with the zero-phase-sequence voltage command superimposed thereon will have the first period Tn for exceeding the Carrier wave periodically.

At this time, the modulation waves ma0, mb0 for the two leg circuits 20A, 20B for the respective phases in the full-bridge chopper circuit unit 20 have polarities different from each other. Therefore, when the zero-phase-sequence voltage command which is a common AC component is added, the timings at which each of the modulation waves ma1, mb1 for the respective phases exceeds the Carrier wave are alternately switched between the phases.

At this time, in a case where the value of the resonant frequency of the filter circuit unit 30 and the value of the frequency of the zero-phase-sequence voltage command are close to each other, the output voltage waveform might exhibit an oscillating form. Therefore, by adjusting the resonant frequency of the filter circuit 30 so as to be lower than the frequency of the zero-phase-sequence voltage command, it is possible to avoid interference between frequencies.

In addition, when the amplitude of the zero-phase-sequence voltage command is set in such a range that does not go outside the maximum value or the minimum value of the modulation wave, it is possible to prevent the modulation wave from inadvertently exceeding the Carrier wave in a region in which the output voltage is small relative to the input voltage.

In addition, if the neutral point NP in the filter circuit unit 30 is connected to the negative side of the DC power supply unit 1 and a neutral point having a neutral point potential between the positive side and the negative side of the DC power supply unit 1, common mode current due to super-imposition of the zero-phase-sequence voltage can be inhib-ited from flowing out to the load device 2 side.

A pulse width limitation unit 259 as shown in FIG. 11 may be provided to perform adjustment so that, when the pulse signal having a width shorter than a predetermined pulse width is outputted from the comparator 55, the pulse signal is forcibly made to have a set minimum pulse width. Thus, it is possible to prevent the pulse from being lost due to the dead time.

In the power conversion device of the present embodi-ment configured as described above, the DC/DC converter includes a full-bridge circuit formed by connecting leg circuits for respective phases in parallel, each leg circuit having the semiconductor switching elements connected in series via a first connection point, and a filter circuit includ-ing reactors and energy storage elements such that first ends of the reactors are respectively connected to the first con-nection points of the leg circuits for the respective phases in the full-bridge circuit, second ends of the reactors are respectively connected to the second DC circuit, and first ends of the energy storage elements are respectively con-nected to the second ends of the reactors. Second ends of the energy storage elements of the filter circuit connected to the leg circuits for the respective phases are connected via a second connection point. The second connection point is connected to a negative side of the first DC circuit or a neutral point having a neutral point potential between a positive side and a negative side of the first DC circuit. The control unit controls the semiconductor switching elements of the leg circuits for the respective phases by the modula-tion waves having polarities inverted between the leg cir-cuits for the respective phases. The control unit superim-poses zero-phase-sequence voltage that oscillates with a cycle that is an integer multiple of a cycle of the carrier wave, on each of the modulation waves for the leg circuits for the respective phases, thus adjusting, in accordance with the value of the modulation wave, the first period for increasing the value of the modulation wave so that the modulation wave exceeds the carrier wave, so as to ensure both of the first cycle T1 and the second cycle T2.

As described above, the zero-phase-sequence voltage command that oscillates with a cycle that is an integer multiple of the cycle of the carrier wave is superimposed on each of the modulation waves for the leg circuits for the respective phases, whereby the first period for increasing the value of the modulation wave so that the modulation wave exceeds the carrier wave can be periodically obtained. Thus, also in a voltage region in which the output voltage range is originally limited due to the influence of the dead time or the like, it becomes possible to stably provide desired output voltage.

In addition, in the filter circuit, the second connection point to which the second ends of the two energy storage elements are connected is connected to the negative side of the first DC circuit or the neutral-point-potential point between the positive side and the negative side of the first DC circuit. Thus, common mode current due to superimpo-sition of the zero-phase-sequence voltage can be inhibited from flowing out to the load device side, so that the output voltage can be stabilized, whereby desired output voltage is obtained.

Figure 12:
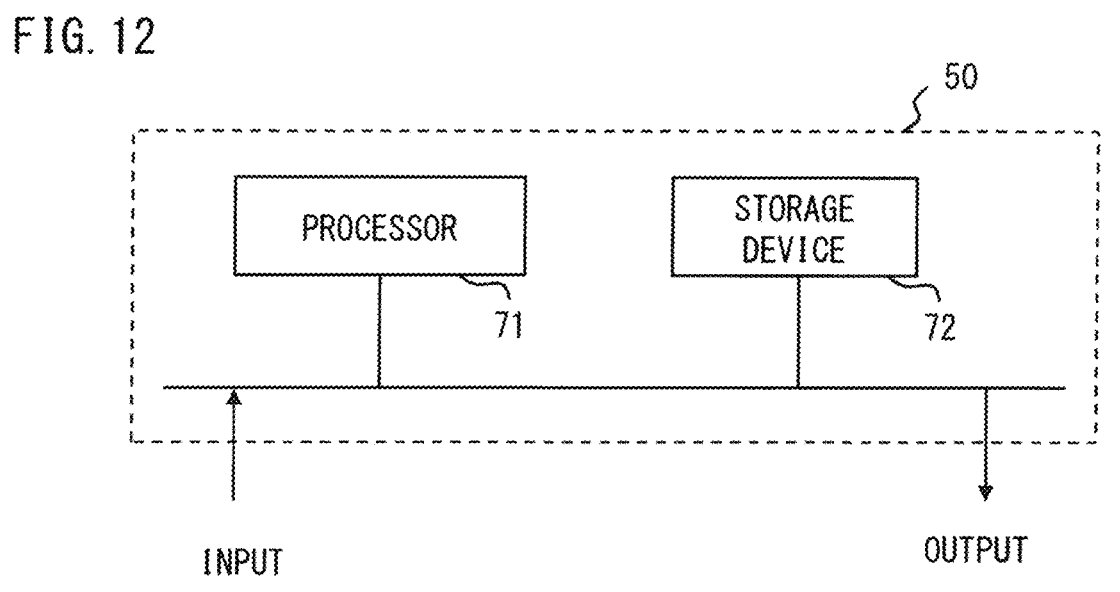

FIG. 12 shows an example of hardware of the control unit 50.

A control device as the control unit 50 is composed of a processor 71 and a storage device 72, as shown in an example of hardware in FIG. 12. The storage device 72 is provided with a volatile storage device such as a random access memory and a nonvolatile auxiliary storage device such as a flash memory, which are not shown.

Instead of the flash memory, an auxiliary storage device of a hard disk may be provided. The processor 71 executes a program inputted from the storage device 72. In this case, the program is inputted from the auxiliary storage device to the processor 71 via the volatile storage device. In addition, the processor 71 may output data such as a calculation result to the volatile storage device of the storage device 72, or may store such data into the auxiliary storage device via the volatile storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constitu-ent components mentioned in at least one of the preferred embodiments may be selected and combined with the con-stituent components mentioned in another preferred embodi-ment.

DESCRIPTION OF THE REFERENCE CHARACTERS

1 DC power supply unit (first DC circuit)
2 load device (second DC circuit)
20A, 20B leg circuit
21SU, 21SL, 22SU, 22SL semiconductor switching ele-ment
30 filter circuit
31C, 32C filter capacitor (energy storage element)
31L, 32L reactor
40 DC/DC converter
100, 100ex1, 100ex2 power conversion device

The invention claimed is:

1. A power conversion device comprising:
a DC/DC converter which has a semiconductor switching element, and which transforms DC voltage inputted from a first DC circuit, in accordance with a voltage command, and outputs the transformed DC voltage to a second DC circuit; and
a controlling circuitry which controls switching of the semiconductor switching element on the basis of com-parison between a carrier wave and a modulation wave which is the voltage command, wherein
the controlling circuitry adjusts, in accordance with a value of the modulation wave, a first period for increas-ing the value of the modulation wave so that the modulation wave exceeds the carrier wave, so as to ensure both of a first cycle T1 in which the semiconductor switching element does not perform switching over one cycle of the carrier wave and a second cycle T2 in which the semiconductor switching element performs switching at any timing in one cycle of the carrier wave.

2. The power conversion device according to claim 1, wherein
the first period is set in a phase range in which a maximum value of the modulation wave is included.

3. The power conversion device according to claim 2, wherein
with a threshold set for the modulation wave, the controlling circuitry increases the value of the modulation wave so that the modulation wave exceeds the carrier wave, in a phase range in which the modulation wave exceeds the threshold, and
the threshold is adjusted so as to provide the first period that ensures both of the first cycle T1 and the second cycle T2.

4. The power conversion device according to claim 1, wherein
the DC/DC converter includes
a full-bridge circuit formed by connecting leg circuits for respective phases in parallel, each leg circuit having the semiconductor switching elements connected in series via a first connection point, and
a filter circuit including reactors and energy storage elements such that first ends of the reactors are respectively connected to the first connection points of the leg circuits for the respective phases in the full-bridge circuit, second ends of the reactors are respectively connected to the second DC circuit, and first ends of the energy storage elements are respectively connected to the second ends of the reactors,
second ends of the energy storage elements of the filter circuit connected to the leg circuits for the respective phases are connected via a second connection point,
the second connection point is connected to a negative side of the first DC circuit or a neutral point having a neutral point potential between a positive side and a negative side of the first DC circuit,
the controlling circuitry controls the semiconductor switching elements of the leg circuits for the respective phases by the modulation waves having polarities inverted between the leg circuits for the respective phases, and
the controlling circuitry superimposes a zero-phase-sequence voltage command that oscillates with a cycle that is an integer multiple of a cycle of the carrier wave, on each of the modulation waves for the leg circuits for the respective phases, thus adjusting, in accordance with the value of the modulation wave, the first period for increasing the value of the modulation wave so that the modulation wave exceeds the carrier wave, so as to ensure both of the first cycle T1 and the second cycle T2.

5. The power conversion device according to claim 4, wherein
an amplitude of the zero-phase-sequence voltage command is set in such a range that does not go outside a maximum value or a minimum value of the modulation wave.

6. The power conversion device according to claim 4, wherein
a resonant frequency of the filter circuit is adjusted to be lower than a frequency of the zero-phase-sequence voltage command.

7. The power conversion device according to claim 1, wherein
the controlling circuitry adjusts the first period by adjusting an amplitude of the carrier wave.

8. The power conversion device according to claim 2, wherein
the DC/DC converter includes
a full-bridge circuit formed by connecting leg circuits for respective phases in parallel, each leg circuit having the semiconductor switching elements connected in series via a first connection point, and
a filter circuit including reactors and energy storage elements such that first ends of the reactors are respectively connected to the first connection points of the leg circuits for the respective phases in the full-bridge circuit, second ends of the reactors are respectively connected to the second DC circuit, and first ends of the energy storage elements are respectively connected to the second ends of the reactors,
second ends of the energy storage elements of the filter circuit connected to the leg circuits for the respective phases are connected via a second connection point,
the second connection point is connected to a negative side of the first DC circuit or a neutral point having a neutral point potential between a positive side and a negative side of the first DC circuit,
the controlling circuitry controls the semiconductor switching elements of the leg circuits for the respective phases by the modulation waves having polarities inverted between the leg circuits for the respective phases, and
the controlling circuitry superimposes a zero-phase-sequence voltage command that oscillates with a cycle that is an integer multiple of a cycle of the carrier wave, on each of the modulation waves for the leg circuits for the respective phases, thus adjusting, in accordance with the value of the modulation wave, the first period for increasing the value of the modulation wave so that the modulation wave exceeds the carrier wave, so as to ensure both of the first cycle T1 and the second cycle T2.

9. The power conversion device according to claim 8, wherein
an amplitude of the zero-phase-sequence voltage command is set in such a range that does not go outside a maximum value or a minimum value of the modulation wave.

10. The power conversion device according to claim 5, wherein
a resonant frequency of the filter circuit is adjusted to be lower than a frequency of the zero-phase-sequence voltage command.

11. The power conversion device according to claim 8, wherein
a resonant frequency of the filter circuit is adjusted to be lower than a frequency of the zero-phase-sequence voltage command.

12. The power conversion device according to claim 9, wherein
a resonant frequency of the filter circuit is adjusted to be lower than a frequency of the zero-phase-sequence voltage command.

13. The power conversion device according to claim 2, wherein
the controlling circuitry adjusts the first period by adjusting an amplitude of the carrier wave.

14. The power conversion device according to claim 3, wherein the controlling circuitry adjusts the first period by adjusting an amplitude of the carrier wave.

15. The power conversion device according to claim 4, wherein the controlling circuitry adjusts the first period by adjusting an amplitude of the carrier wave.

16. The power conversion device according to claim 5, wherein the controlling circuitry adjusts the first period by adjusting an amplitude of the carrier wave.

17. The power conversion device according to claim 6, wherein the controlling circuitry adjusts the first period by adjusting an amplitude of the carrier wave.

18. The power conversion device according to claim 8, wherein the controlling circuitry adjusts the first period by adjusting an amplitude of the carrier wave.

19. The power conversion device according to claim 9, wherein the controlling circuitry adjusts the first period by adjusting an amplitude of the carrier wave.

20. The power conversion device according to claim 10, wherein the controlling circuitry adjusts the first period by adjusting an amplitude of the carrier wave.

\* \* \* \* \*